US007298881B2

(12) United States Patent
Giger et al.

(10) Patent No.: US 7,298,881 B2
(45) Date of Patent: Nov. 20, 2007

(54) METHOD, SYSTEM, AND COMPUTER SOFTWARE PRODUCT FOR FEATURE-BASED CORRELATION OF LESIONS FROM MULTIPLE IMAGES

(75) Inventors: Maryellen L Giger, Elmhurst, IL (US); HuiHua Wen, Wilmette, IL (US); Li Lan, Naperville, IL (US)

(73) Assignee: University of Chicago, Chicago, IL (US)

( * ) Notice: Subject to any disclaimer, the term of this patent is extended or adjusted under 35 U.S.C. 154(b) by 162 days.

(21) Appl. No.: 11/056,368

(22) Filed: Feb. 14, 2005

(65) Prior Publication Data

US 2006/0004278 A1    Jan. 5, 2006

Related U.S. Application Data

(60) Provisional application No. 60/544,237, filed on Feb. 13, 2004.

(51) Int. Cl.
*G06K 9/00* (2006.01)

(52) U.S. Cl. .................. 382/128; 128/922; 378/21; 378/37; 378/62; 382/219; 600/407

(58) Field of Classification Search ................ 128/922; 345/32; 378/19, 21, 37, 62; 382/128, 130, 382/131, 132, 219; 600/407, 425
See application file for complete search history.

(56) References Cited

U.S. PATENT DOCUMENTS

| | | | | |
|---|---|---|---|---|
| 5,828,774 A | * | 10/1998 | Wang | 382/128 |
| 6,075,879 A | * | 6/2000 | Roehrig et al. | 382/132 |
| 6,138,045 A | * | 10/2000 | Kupinski et al. | 600/425 |
| 6,151,417 A | * | 11/2000 | Florent | 382/265 |
| 6,310,967 B1 | * | 10/2001 | Heine et al. | 382/128 |
| 6,373,998 B2 | * | 4/2002 | Thirion et al. | 382/294 |
| 6,631,204 B1 | * | 10/2003 | Smith | 382/130 |
| 6,683,973 B2 | * | 1/2004 | Li et al. | 382/132 |
| 6,735,745 B2 | * | 5/2004 | Sarig | 716/4 |
| 6,855,114 B2 | * | 2/2005 | Drukker et al. | 600/443 |

(Continued)

FOREIGN PATENT DOCUMENTS

WO    WO 9515537 A1  *  6/1995

OTHER PUBLICATIONS

Josien P. W. Pluim, et al., Mutual-Information-Based Registration of Medical Images: a Survey, Aug. 2003, IEEE Transactions on Medical Imaging, vol. 22, No. 8.

(Continued)

*Primary Examiner*—Gregory M Desire
(74) *Attorney, Agent, or Firm*—Oblon, Spivak, McClelland, Maier & Neustadt, P.C.

(57) ABSTRACT

A method, system, and computer software product for correlating medical images, comprising: obtaining first image data representative of a first medical image including a first abnormality; obtaining second image data representative of a second medical image including a second abnormality; determining at least one feature value for each of the first and second abnormalities using the first and second image data; calculating, based on the determined feature values, a likelihood value indicative of a likelihood that the first and second abnormalities are a same abnormality; and outputting the determined likelihood value.

30 Claims, 10 Drawing Sheets

U.S. PATENT DOCUMENTS

| | | |
|---|---|---|
| 6,907,102 B1 * | 6/2005 | Sauer et al. .................. 378/19 |
| 7,162,061 B1 * | 1/2007 | Takeo ......................... 382/128 |
| 2003/0007598 A1 | 1/2003 | Wang et al. |
| 2005/0234570 A1 * | 10/2005 | Horsch et al. ................ 700/93 |
| 2005/0265606 A1 * | 12/2005 | Nakamura .................. 382/218 |
| 2006/0004278 A1 * | 1/2006 | Giger et al. ................. 600/408 |

OTHER PUBLICATIONS

Lubomir Hadjiiski, et al., Automated Registration of Breast Lesions in Temporal Pairs of Mammograms for Interval Change an Alysis—Local Affine Transformation for Improved Localization, Apr. 9, 2001, Med. Phys. 28 (6).

* cited by examiner (a)            (b)

FIG. 4A
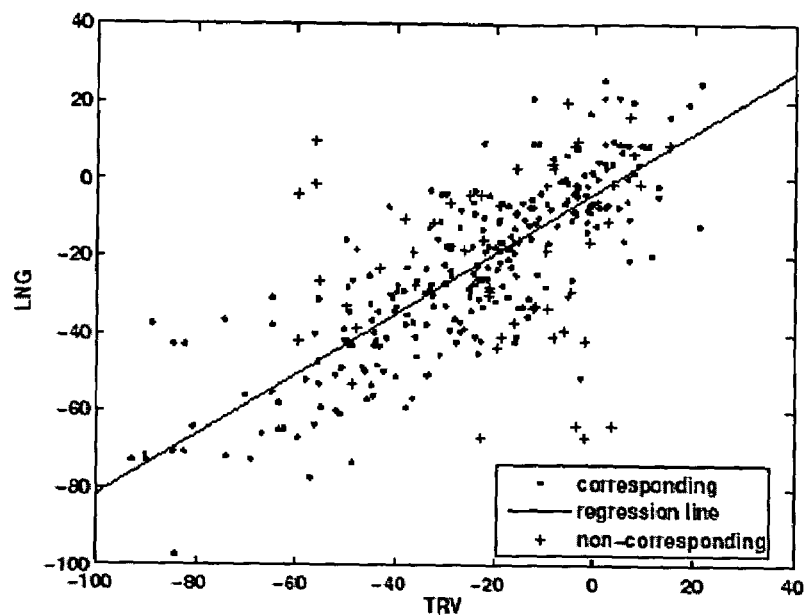
(a)
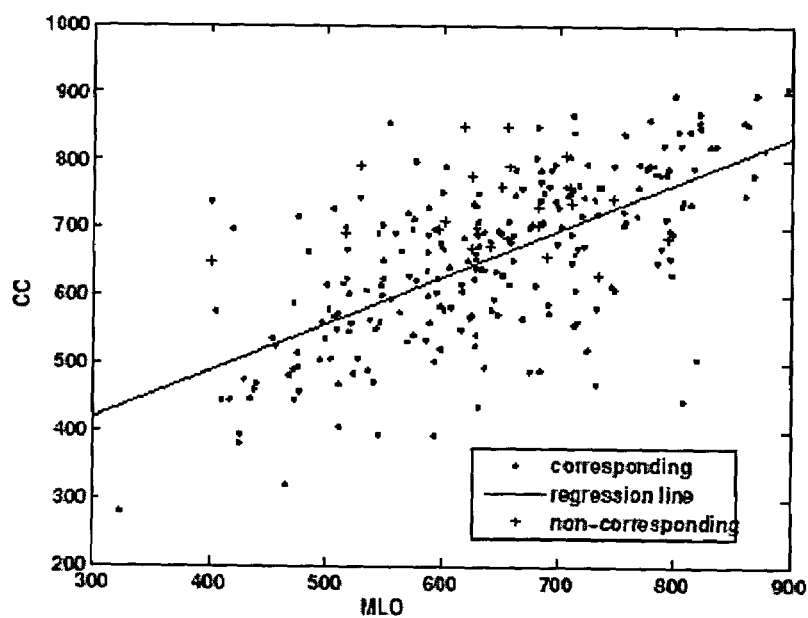
(b)
FIG. 4B

METHOD, SYSTEM, AND COMPUTER SOFTWARE PRODUCT FOR FEATURE-BASED CORRELATION OF LESIONS FROM MULTIPLE IMAGES

CROSS-REFERENCE TO RELATED APPLICATIONS

This application claims the benefit under 35 U.S.C. § 119(e) of the filing date of Provisional Application Ser. No. 60/544,237, filed Feb. 13, 2004, the contents of which are incorporated herein by reference.

STATEMENT REGARDING FEDERALLY SPONSORED RESEARCH

The present invention was made in part with U.S. Government support under USPHS Grant No. T32 CA09649. The U.S. Government may have certain rights to this invention.

BACKGROUND OF THE INVENTION

Field of the Invention

The present invention is directed to feature-based correlation of lesions from multiple images. More precisely, the present invention relates to the correlation of lesions observed on breast images acquired from different modalities, which may include, e.g., mammography, breast sonography, and magnetic resonance imaging (MRI). The present invention also relates to the correlation of lesions observed on breast images acquired from different views, times, or protocols, of a single modality for a given patient.

The present invention also generally relates to computerized techniques for automated analysis of digital images, for example, as disclosed in one or more of U.S. Pat. Nos. 4,839,807; 4,841,555; 4,851,984; 4,875,165; 4,918,534; 5,072,384; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,141,437; 6,185,320; 6,205,348; 6,240,201; 6,282,305; 6,282,307; 6,317,617 as well as U.S. patent application Ser. Nos. 08/173,935; 08/398,307 PCT Publication WO 96/27846); 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; 60/329,322; 09/990,311; 09/990,310; 09/990,377; 10/360,814; and 60/331,995; and PCT patent applications PCT/US98/15165; PCT/US98/24933; PCT/US99/03287; PCT/US00/41299; PCT/JS01/00680; PCT/US01/01478 and PCT/US01/01479, all of which are incorporated herein by reference.

The present invention includes the use of various technologies referenced and described in the documents identified in the following LIST OF REFERENCES:

LIST OF REFERENCES

[1] E. A. Sickles, W. N. Weber, H. B. Galvin, S. H. Ominsky, and R. A. Sollitto, "Baseline screening mammography: one vs two views per breast," Am. J. Roentgenol., vol. 147(6), pp. 1149-53, 1986.

[2] R. G. Blanks, S. M. Moss, and M. G. Wallis, "Use of two view mammography compared with one view in the detection of small invasive cancers: further results from the National Health Service breast screening programme," J. Med. Screen., vol. 4(2), pp. 98-101, 1997.

[3] N. Vujovic and D. Brzakovic, "Control points in pairs of mammographic images," IEEE IP, vol. 6(10), pp. 1388-1399, 1997.

[4] Y. Kita, R. P. Highnam, and J. M. Brady, "Correspondence between Different View Breast X-Rays Using a Simulation of Breast Deformation," in Proceedings of the IEEE Computer Society Conference on Computer Vision and Pattern Recognition, June 23-25, pp. 700, 1998.

[5] S. L. Kok-Wiles, J. M. Brady, and R. P. Highnam, "Comparing mammogram pairs in the detection of lesions," in Proceedings of the 4th International Workshop on Digital Mammography, Nijmegen, The Netherlands, June 1998.

[6] F. F. Yin, M. L. Giger, K. Doi, et al., "Computerized detection of masses in digital mammograms: automated alignment of breast images and its effect on bilateral-subtraction technique," Med. Phys. vol. 21(3), pp. 445-452, 1994.

[7] N. Karssemeijer and G. M. te Brake, "Combining single view features and asymmetry for detection of mass lesions," in Proceedings of the 4th International Workshop on Digital Mammography, Nijmegen, The Netherlands, June 1998, pp. 95-102.

[8] R. Chandrasekhar and Y. Attikiouzel, "A Simple Method for Automatically Locating the Nipple on Mammograms," IEEE Trans. Med. Imaging, vol. 16(5), pp. 483-494, 1997.

[9] S. van Engeland and N. Karssemeijer, "Matching Breast Lesions in Multiple Mammographic Views," in Proceedings of MICCAI 2001: 4th International Conference, Utrecht, The Netherlands, October 14-17, pp. 1172, 2001.

[10] F. Richard and L. Cohen, "A new image registration technique with free boundary constraints: application to mammography," Computer Vision and Image Understanding, vol. 89, pp. 166-196, 2003.

[11] L. Hadjiiski, H. Chan, B. Sahiner, N. Petrick, and M. A. Helvie, "Automated registration of breast lesions in temporal pairs of mammograms for interval change analysis local affine transformation for improved localization," Med. Phys., vol. 28(6), pp. 1070-1079, 2001.

[12] S. van Engeland, P. Snoeren, J. Hendriks, and N. Karssemeijer, "A Comparison of Methods for Mammogram Registration," IEEE Trans. Med. Imaging, vol. 22(11), pp. 1436-1444, 2003.

[13] G. Xiao, J. M. Brady, J. A. Noble, M. Burcher, and R. English, "Non-rigid registration of 3-D free-hand ultrasound images of the breast," IEEE Trans. Med. Imaging, vol. 21, pp. 405-412, 2002.

[14] J. F. Krucker, G. L. LeCarpentier, J. B. Fowlkes, and P. L. Carson, "Rapid Elastic Image Registration for 3D Ultrasound," IEEE Trans. Med. Imaging, vol. 21, pp. 1384-1394, 2002.

[15] Z. Huo, M. L. Giger, C. J. Vyborny, U. Bick, P. Lu, D. E. Wolverton, and R. A. Schmidt, "Analysis of spiculation in the computerized classification of mammographic masses," Med. Phys., vol. 22, pp. 1569-1579, 1995.

[16] M. A. Kupinski and M. L. Giger, "Automated seeded lesion segmentation on digital mammograms," IEEE Trans. Med. Imaging, vol. 17, pp. 510-517, 1998.

[17] M. L. Giger, H. Al-Hallaq, Z. Huo, C. Moran, D. E. Wolverton, C. W. Chan, and W. Zhong, "Computerized analysis of lesions in US images of the Breast," Acad. Radiol., vol. 6, pp. 665-674, 1999.

[18] K. Horsch, M. L. Giger, L. A. Venta, and C. J. Vyborny, "Automatic segmentation of breast lesions on ultrasound," Med. Phys., vol. 28, pp. 1652-1659, 2001.

[19] K. Horsch, M. L. Giger, L. A. Venta, and C. J. Vyborny, "Computerized diagnosis of breast lesions on ultrasound," Med. Phys., vol. 29, pp. 157-164, 2002.

[20] Z. Huo, M. L. Giger, and C. J. Vyborny, "Computerized analysis of multiple-mammographic views: potential usefulness of special view mammograms in computer-aided diagnosis," IEEE Trans. Med. Imaging, vol. 20, pp. 1285-1292, 2001.

[21] Z. Huo, M. L. Giger, D. E. Wolverton, W. Zhong, S. Cumming, and O. I. Olopade, "Computerized analysis of mammographic parenchymal patterns for breast cancer risk assessment: feature selection," Med. Phys., vol. 27, pp. 4-12, 2000.

[22] M. A. Kupinski, D. C. Edwards, M. L. Giger, and C. E. Metz, "Ideal Observer Approximation Using Bayesian Classification Neural Networks," IEEE Trans. Med. Imaging, vol. 20, pp. 886-899, 2001.

[23] C. E. Metz and X. Pan, "Proper binormal ROC curves: theory and maximum-likelihood estimation," J. Math. Psych., vol. 43, pp. 1-33, 1999.

The entire contents of each reference listed in the LIST OF REFERENCES are incorporated herein by reference.

DISCUSSION OF THE BACKGROUND

The merging of information from images obtained from mammography, ultrasound, and MRI is an important problem in breast cancer diagnosis. Breast images of a given patient can provide complementary information regarding an abnormality. Moreover, comparing the images also improves their interpretation.

Radiologists frequently compare breast images taken at different times for identifying and evaluating lesions. Also, diagnostic mammography and breast sonography are routinely performed to evaluate breast abnormalities that are initially detected with screening mammography or on physical examination.

However, comparing multiple images taken by the same modality, but in different views or according to different configurations of parameters, is a nontrivial task that requires considerable expertise and experience on the part of radiologists. Indeed, there is considerable difficulty in comparing multiple breast images or fusing information from multiple breast images. This difficulty is due in part to the images themselves, which provide non-identical, but complementary information concerning the lesion. In addition, whereas more than one lesion may be present in a patient in some cases, the totality of the lesions may not be represented on all images obtained in a study. Furthermore, lesions of the same abnormality can exhibit different characteristics in different images due to differences in view projection, imaging time, and/or contrast mechanism.

In light of these difficulties, computer-based techniques are needed to correlate lesions observed on breast images acquired for a given patient either using different modalities, such as mammography, breast sonography, and MRI, or using a single modality, but different views, times, or protocols for that modality. In fact, such techniques are acutely needed since such correlations arise in numerous applications, including applications using multi-view mammograms, sonograms, or multi-modal images for breast cancer diagnosis. Such correlations also arise in applications comparing breast images in longitudinal studies for evaluation of disease diagnosis, prognosis, or patient management for both human interpretation as well as CAD methods.

It is known that using at least two views of mammograms allows radiologists to better detect and evaluate breast abnormalities [1,2]. Studies have attempted to develop computer algorithms determining geometrical transformations that can establish a one-to-one mapping between two mammographic images.

Image registration techniques that have been considered for matching mammogram pairs include identifying and matching control points [3] and identifying and matching inherent image landmarks, such as curves [4], regions [5], breast skin line [6,7] and nipple position [8,9] to minimize energy functions defined by intensities and contours of regions of interest [10].

Several image registration techniques have been applied to detect lesions in temporal pairs of mammograms [11]. The purpose of such registration methods [12], often used to compensate for differences in breast compression, positioning and acquisition protocols on mammograms, is to aid radiologist in detecting and analyzing changes in the breast that may have occurred between the mammograms as well as new asymmetries observed between the left and right breast.

Recent ultrasound-to-ultrasound breast image registration studies [13,14] have concentrated on 3-D compound images. The volumes reconstructed therein typically have deteriorated spatial resolution because of the presence of refraction artifacts and tissue mis-registration between sequential 2-D scans. Both studies use voxel-based intensity correlation coefficients between two sub-volumes to implement a deformation energy function and mutual information.

There is also a need for automated classification and computer-aided diagnosis of mass lesions in breast. That is, one would like to determine as reliably as possible whether breast lesions are benign or malignant using computer-extracted features of the lesions found on mammograms or sonograms [15,16,17,18].

Further, correlating lesions from two different breast mammogram views of a given modality using CAD is generally accepted as a second opinion to that of radiologists. It is highly desirable, when attempting to differentiate between benign and malignant breast lesions using a two-view mammogram or sonogram analysis, to have corresponding lesions arranged in pairs to merge information. Due to the elasticity of the breast tissue, deformation in the positioning and compression of the examination procedure vary from one examination to the other. As a result, finding the geometric relationship between breast images poses a rather daunting task.

Consequently, deformable registration techniques typically require a sophisticated model to obtain consistent deformations both locally and globally. Iterative optimization techniques are often needed to estimate geometric transformation parameters. However, the similarity measurement or fitness function defined to that end is often highly non-linear and contains many local maxima. Further, these optimization techniques do not guarantee convergence to the global maximum. In addition, these techniques are often computationally very expensive and thus difficult to use in a clinical setting.

SUMMARY OF THE INVENTION

Accordingly, to overcome the problems of the related art, an embodiment of the present invention provides a method, system, and medium for performing feature-based correlation of lesions in multiple images.

According to an aspect of the present invention, there is provided a method, system, and medium for correlating medical images, comprising: (1) obtaining a first medical image including a first lesion; (2) obtaining a second medical image including a second lesion; (3) determining at least one feature value for each of the first and second lesions using image data of the first and second medical images; (4) calculating, based on the determined feature values, a likelihood value indicative of a likelihood that the first and second lesions are a same lesion; and (5) outputting the determined likelihood value.

According to an aspect of the present invention, there is provided a method, system, and medium for performing a feature-based correlation of lesions obtained from different modalities including mammography, sonography, and magnetic resonance imaging.

According to another aspect of the present invention, there is provided a method, system, and medium for performing a feature-based correlation of lesions obtained from different views, times, or protocols for a single modality.

According to another aspect of the present invention, there is provided a method, system, and medium for performing a correlation of multiple lesions based on a single feature.

According to another aspect of the present invention, there is provided a method, system, and medium for performing a correlation of multiple lesions based on a plurality of features.

According to another aspect of the present invention, there is provided a method, system, and medium for characterizing whether lesions from a plurality of images correspond to the same lesion.

According to another aspect of the present invention, there is provided a method, system, and medium for automatically characterizing abnormalities using features that are traditionally used by radiologists in the clinical evaluation of breast masses as well as lower-level features that may not be as intuitive to the radiologist's eye-brain system. These radiographic image features emerge within embodiments of the present invention as mathematical descriptors of characteristics of mass lesions and automatically correlate, i.e., match, lesions observed on multiple breast images of the same patient.

Embodiments of the present invention provide new automated methods, systems, and media employing an intelligent computer system/workstation for computer-assisted interpretation of breast magnetic resonance imaging medical images.

Embodiments of the present invention provide a classification scheme for an automated matching of lesions from multiple breast images, thereby aiding radiologists or oncologists, who are presented with matching likelihood values in a human-readable form, to compare and combine information from mammography, breast ultrasound, or other image modalities to improve diagnostic accuracy and overall patient outcome.

Embodiments of the present invention identify specific features that achieve automatic lesion matching, thereby aiding radiologists or oncologists to compare and combine information from multi-modality breast images, and improve diagnostic accuracy and overall patient outcome. Moreover, the features can be used without any information regarding the location of a lesion characterized by those features.

Embodiments of the present invention also facilitate identification of incorrectly matched lesions that belong to different patients.

Other methods, systems, and media of the present invention will become apparent to one of ordinary skill in the art upon examination of the following drawings and detailed description of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A and 4B illustrate two-dimensional distributions of an image feature generated from images taken in two different views for corresponding and non-corresponding datasets;

DETAILED DESCRIPTION OF THE PREFERRED EMBODIMENTS

Figure 1A:
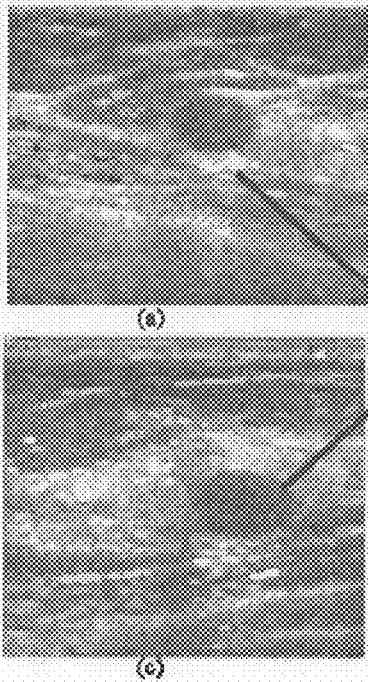
FIGS. 1A-1D illustrate four ultrasound images of two lesions in the right breast of a patient.

The aforementioned difficulties are mitigated by using image features associated with the lesions and developing a classification scheme for establishing lesion correspondence. That is, given two breast images, lesions are first automatically segmented from the surrounding breast tissues and a set of features (feature vector) is automatically extracted from each identified lesion. Subsequently, for every two indicated lesions that are not in the same image, a classifier will examine their features and yield the likelihood that the two lesions correspond to the same physical lesion.

Image features produced by automatic segmentation that have been successful in developing computer-aided diagnosis (CAD) of breast cancers are also useful for the task of lesion matching. An appropriate subset of features useful for discriminating corresponding and non-corresponding lesion pairs will need to be determined. The features will then be used to develop discrimination methods for automated correlating of lesions from multiple breast images.

Canonical correlation is a statistical analysis for identification and quantification of associations between two sets of variables. Canonical correlation works by finding linear combinations of variables from each set, called canonical variables, such that the correlation between the two canonical variables is maximized. The advantage of this technique is to concentrate a high-dimensional relationship between the two sets of variables into a few pairs of canonical variables. According to an embodiment of the present invention, canonical correlation analysis is performed to identify a subset of features for the discrimination task.

To identify useful features for discrimination, one selects features that have a higher canonical correlation coefficient generated by the same physical lesion and have a lower correlation generated by different lesions.

Database

Embodiments of the present invention will be discussed using certain databases of medical images. These databases will now be described to facilitate an understanding of the present invention. However, it is to be understood that the use of these databases does not limit the scope of the invention in any way and the correlation analysis can be implemented for other types of medical images, such as chest radiography, magnetic resonance imaging, etc.

First, consider a sonographic database of 262 biopsy-proven lesions. Specifically, each sonographic biopsy-proven lesion includes both transverse and longitudinal views, and the 262 lesions include 81 complicated cysts, 115 benign lesions, and 66 malignant lesions.

Second, consider a mammography database of 230 biopsy-proven lesions. Specifically, each mammography biopsy-proven lesion includes craniocaudal (CC) and mediolateral oblique (MLO) views, and the lesions include 112 complicated cysts, 8 benign solid lesions, and 110 malignant lesions.

Further, in order to mimic a lesion mismatch scenario that might occur in clinical practice, consider also three "non-corresponding" datasets denoted by A, B, and C.

Dataset A contains lesion pairs obtained from patients who had two or more lesions shown on different image views. One lesion from one view was paired with the other lesion in another view, of the same patient, as a non-corresponding lesion pair. The sonographic database comprises 35 patients who had two or more lesions shown on transverse and longitudinal views, which leads to 53 non-corresponding lesion pairs. The mammographic database comprises 11 patients who had two or more lesions shown on transverse and longitudinal views, which leads to 25 non-corresponding lesion pairs.

Figure 1B:
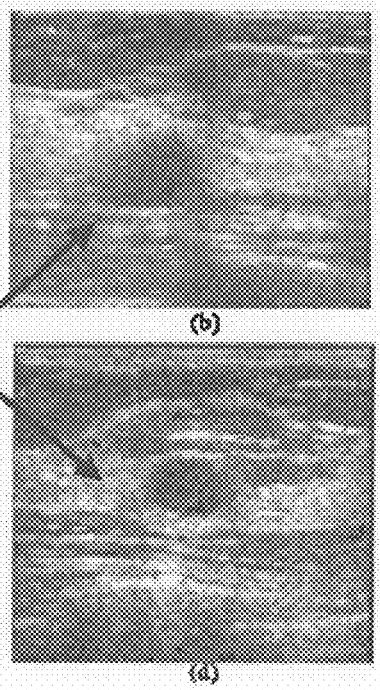
Figure 1C:
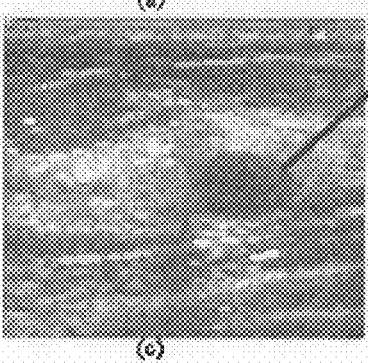
Figure 1D:
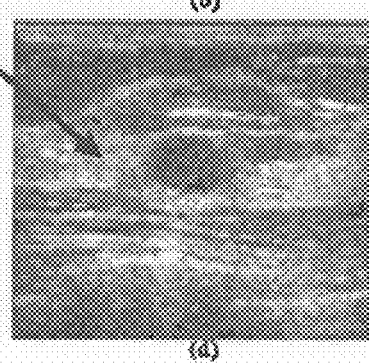

FIGS. 1A-1D illustrate four ultrasound images. The images represent two lesions, taken in both transverse and longitudinal views, from the right breast of a patient. FIG. 1A shows a transverse image for the lesion at location 10:00 B. FIG. 1B shows a longitudinal image for the lesion at location 1:00 A. FIG. 1C shows a transverse image for the lesion at location 1:00 A. FIG. 1D shows a longitudinal image for the lesion at location 10:00 B. The same lesion, shown in different views, has different shape and orientation. The arrow indicates the correspondence between scans belonging to the same physical lesion.

Figure 2A:
FIGS. 2A and 2B illustrate two mammographic views, mediolateral oblique (MLO) and craniocaudal (CC), of two lesions in the same breast.
Figure 2B:
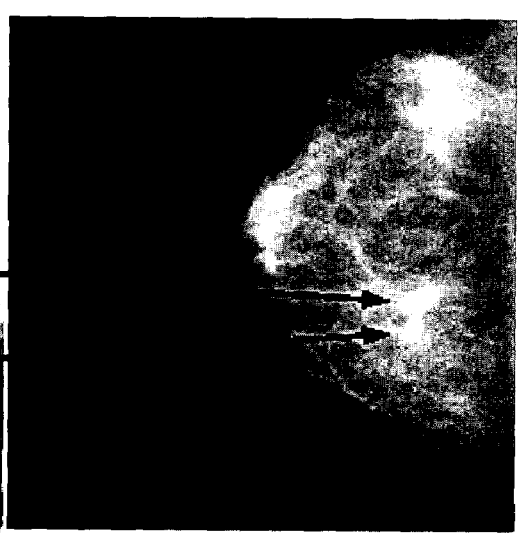

FIGS. 2A and 2B illustrate two mammographic lesions in the same breast. FIG. 2A shows a MLO view and FIG. 2B shows a CC view. Again, the same lesion, shown in different views, has a different shape and orientation since the images are taken from different angles. The arrow indicates the correspondence between scans belonging to the same physical lesion.

There are few patients having two or more lesions in the same breast in the non-corresponding database. The non-corresponding dataset must therefore be extended by generating lesion pairs across patients. To that end, dataset B contains lesion pairs obtained from different patients who have lesions with the same pathology and dataset C contains lesion pairs obtained from different patients who have lesions with different pathology.

One approach to constitute these "non-matching lesion" datasets is to generate all possible lesion combinations across patients with the same lesion pathology, or with the different pathology, and then randomly select 300 pairs among all possible pairs.

Table I summarizes the number of lesion pairs contained in each dataset for both databases.

| Database | Corresponding Dataset (pairs) | Non-corresponding Datasets (pairs) | | |
|---|---|---|---|---|
| | | A | B | C |
| Sonography | 262 | 53 | 300 | 300 |
| Mammography | 230 | 25 | 300 | 300 |

A Classification Framework for Lesion Matching

Conventional approaches for matching lesions generally begin with an attempt to spatially align two images in order to establish a one-to-one pixel correspondence between the images. Once the images are aligned, establishing lesion correspondence can be relatively straightforward. Unfortunately, an adequate spatial alignment between two breast images is often very difficult to achieve due to the non-rigid morphology of the breast and the differences in imaging protocols. For example, breast compression is applied in obtaining mammograms but not in breast ultrasound. Moreover, it is also rather impractical to exactly reproduce the compression applied in a mammography. Therefore, a breast can exhibit significantly different shapes on two images. In addition, while an entire breast is typically imaged in mammography, only a portion of the breast is usually scanned in ultrasound, further complicating the task of spatially aligning two such breast images. These difficulties associated with the spatial alignment of breast images can be mitigated by using local image features associated with the lesions for establishing lesion correspondence. To achieve this, one can use image features produced by automatic classification schemes. These image features have been successful used in developing computer-aided diagnosis (CAD) of breast cancers and are also suitable for the task of lesion matching.

Classification has been widely applied in CAD and image analysis. Typically, once a suspicious region is detected, features characterizing the region are extracted. These features, or a subset of them, are then employed in an automatic classifier to yield an estimate of the probability of malignancy.

Figure 3:
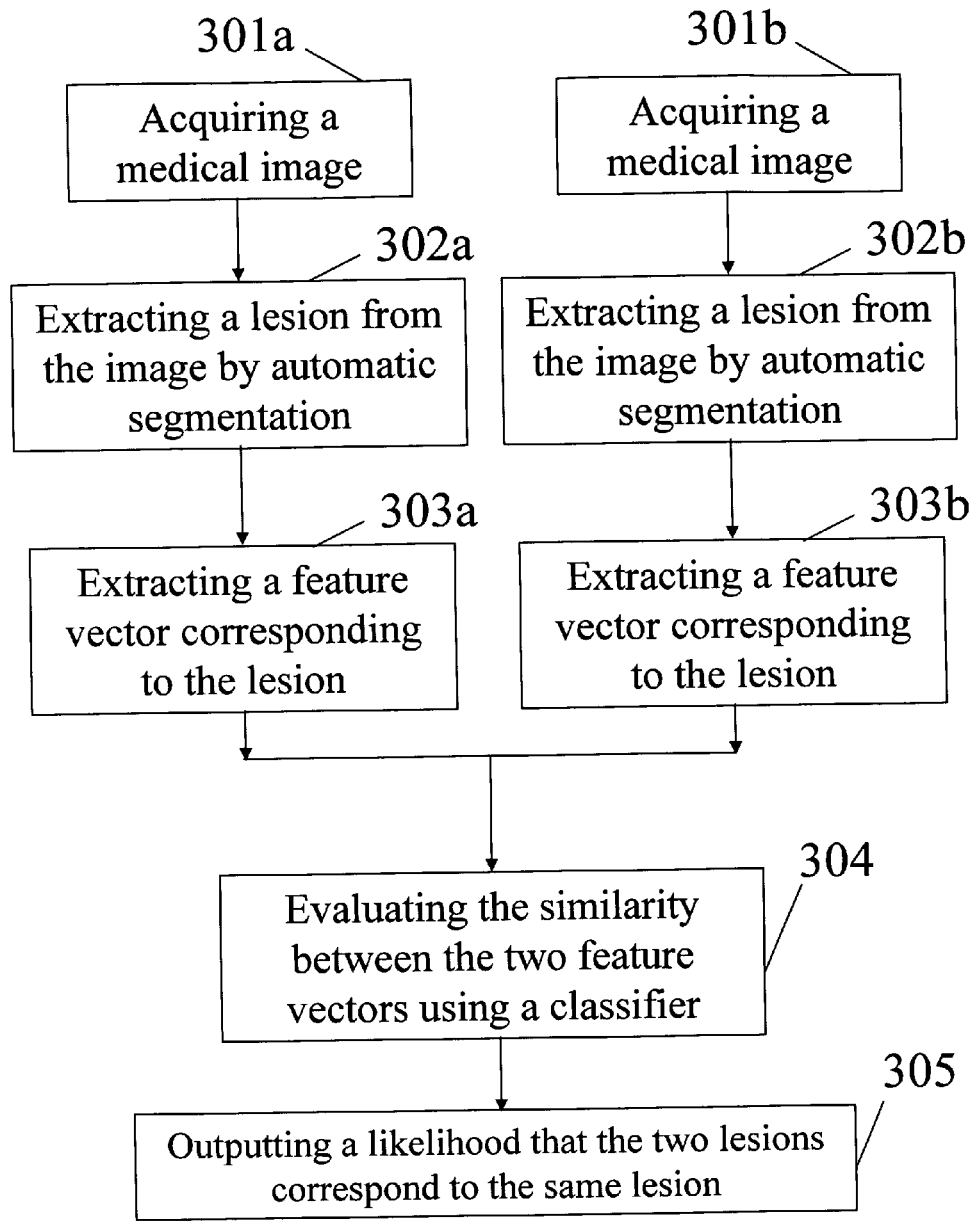
FIG. 3 illustrates a method for feature-based automated classification and matching.

FIG. 3 illustrates generally a method for lesion matching. Instead of a geometric transformation establishing the correct one-to-one mapping between (x, y) locations in two image, an embodiment the method uses lesion characteristics automatically extracted from lesions in the two images to distinguish between corresponding and non-corresponding lesion pairs. In FIG. 3, two images are acquired in steps 301a and 301b, respectively. In steps 302a and 302b, lesions are extracted from the images by automatic segmentation from the surrounding breast tissues. This can be done using any conventional segmentation technique. Naturally, any kind of segmentation approach could also be used within the scope of the present invention. In steps 303a and 303b, feature vectors are extracted corresponding to the automatically segmented lesions. Subsequently, in step 304, a classifier evaluates the similarity between the features of the lesions. In step 305, the likelihood that the two lesions correspond to the same physical lesion is determined.

The lesion-matching step performed in step 304 will now be described in more depth. Let $\vec{x}_1$ denote the feature vector extracted for a lesion seen in one image, and let $\vec{x}_2$ denote the feature vector extracted for a lesion seen in another image. A classifier examines the "similarity" between the feature vectors $\vec{x}_1$ and $\vec{x}_2$ to yield an estimate of the likelihood that the two lesions correspond to the same physical lesion seen on two different images. An appropriate "similarity" measure is learned from two datasets of the feature pairs, one derived from the same physical lesions seen in different images, the "corresponding dataset," and the other derived from physically different lesions seen in different images, the "non-corresponding dataset."

In general, the two images can be generated either using the same imaging modality or using different imaging modalities. In both cases, the images can be taken in different views and/or using different imaging parameters. In addition, the classification task can consider multiple image features. Consider a single image feature for each image, denoted $x_1$ and $x_2$, respectively, in designing the classifier. Extensions to multi-element feature vectors and multi-modality lesion matching naturally fall within the scope of the present invention. The two-dimensional (2D) distributions of the feature pair $(x_1, x_2)$ show that the feature pair derived from corresponding datasets exhibit a linear relationship. Therefore, in designing a classifier, applying linear regression is appropriate. Subsequently, one obtains the likelihoods for a given feature pair based on the distance from the derived regression line for pairs corresponding to the same physical lesions and for those from physically different lesions. Classification of whether two lesions seen on two images correspond to the same physical lesion is based, for example, on a likelihood ratio test. The performance of the proposed classification scheme is evaluated by receiver operating characteristics (ROC) analysis [23].

Modeling with Linear Regression and Feature Selection

FIGS. 4A and 4B illustrate the two-dimensional distribution of an image feature generated from sonographic images taken in the transverse and longitudinal views for corresponding and non-corresponding datasets. FIG. 4A relates to the sonographic image feature posterior acoustic behavior extracted from lesions seen on the transverse and longitudinal views. FIG. 4B relates to the mammographic image feature average gray value extracted from lesions seen on the MLO and CC views.

A linear relationship is observed for feature pairs extracted from the corresponding dataset. In comparison, feature pairs derived from the non-corresponding dataset show a much wider spread in distribution.

This difference between the spread of the distribution for the two populations can be utilized for classification. To that end, one can compute a correlation coefficient r for the 2D feature distribution generated from the corresponding dataset and a correlation coefficient r' for the distribution generated from the non-corresponding datasets. The correlation coefficient may be, for example, Pearson's coefficient.

One can also obtain p-values of the derived correlation coefficients. This procedure allows the identification of a number of candidate features that may be useful for the proposed lesion-matching task. For example, one may select features that yield $r \geq 0.5$ with $p \leq 0.05$ while $r' \leq 0.5$.

Principal component analysis (PCA) provides a useful means for identifying the linear relationship observed in FIGS. 4A and 4B. Given the joint distribution of n zero-mean random variables, $z_1, \ldots, z_n$, PCA identifies the orthonormal vectors $\hat{e}_1, \ldots, \hat{e}_n$ (called the principal axes) so that the distributions of $\hat{z}_i = \vec{z} \cdot \hat{e}_1$, i=2, ..., n, where $\vec{z} = (z_1, \ldots, z_n)$, are mutually uncorrelated. Furthermore, the distribution of $\hat{z}_1$ has the largest variance among all unitary transforms of $\vec{z}$, i.e., the 1D subspace spanned by $\hat{e}_1$ contains the most significant statistical variations of the distribution.

Similarly, for i=2, ..., n, $\hat{z}_1$ is the unitary transform of $\vec{z}$ that has the largest variance while are statistically uncorrelated to $\hat{z}_1, \ldots, \hat{z}_{i-1}$; i.e., the 1D subspace spanned by $\hat{e}_1$ contains the most statistical variations of the distribution in the subspace orthogonal to the subspace spanned by $\hat{e}_1, \ldots, \hat{e}_{i-1}$. Consider now the application of PCA to the 2D distributions of the feature pair $(x_1, x_2)$ derived from the corresponding database.

Before applying PCA, the mean of the distribution $(\bar{x}_1, \bar{x}_2)$ is calculated and subtracted from the data thereby yielding a zero-mean population $(\tilde{x}_1, \tilde{x}_2)$, where $\tilde{x}_1 = x_1 - \bar{x}_1$ and $\tilde{x}_2 = x_2 - \bar{x}_2$. The most significant statistical variations of the distribution of $(\tilde{x}_1, \tilde{x}_2)$ will therefore appear in the first principal axis $\hat{e}_1$. Conversely, the spread of the distribution of the feature pair derived from the corresponding dataset along the second principal axis $\hat{e}_2$ is minimized among all possible axes in the $\tilde{x}_1$–$\tilde{x}_2$ space. However, the spread of the distribution of the feature pair derived from the non-corresponding dataset is not necessarily minimized along this axis.

Therefore, a large difference in the spreads of the distributions of the two populations is likely to be observed along $\hat{e}_2$. Let $\hat{e}_1 = (e_{11}, e_{12})$, $e_{11} \neq 0$. The regression line in the $x_1$–$x_2$ space corresponding to the $\hat{e}_1$ axis in the $\tilde{x}_1$–$\tilde{x}_2$ space is given by $$L: \{(x_1, x_2): x_2 = \beta_0 + \beta_1 x_1\}, \text{ where } \beta_0 = \bar{x}_2 + \left(\frac{e_{12}}{e_{11}}\right)\bar{x}_1 \text{ and } \beta_1 = \frac{e_{12}}{e_{11}}.$$

Likelihood Ratio Test

The task of a two-group automated classifier is to map a multidimensional observation variable into a scalar decision variable from which a threshold can be derived to determine which group an observation belongs to. A good candidate variable for discriminating feature pairs generated from the corresponding dataset against those from the non-corresponding dataset can be achieved by considering a function of the distance of a feature pair to the regression line L. In particular, one can consider the respective likelihood of a feature pair being at a given distance from the regression line when the pair is derived from the corresponding and the non-corresponding datasets. Discrimination can then be based on a likelihood-ratio criterion [22].

Let $H_1$ denote the hypothesis that a given feature pair $(x_1, x_2)$ is derived from the same physical lesion and $H_0$ the hypothesis that it is derived from physically different lesions. Let d denote the distance of this feature pair to the regression line established from the corresponding dataset, as described above. The likelihood of $H_1$ being true given the feature pair is the conditional probability for obtaining the feature pair given the hypothesis, i.e., $l_1(d) = \text{prob}(d|H_1)$.

Similarly, the likelihood of $H_0$ being true given the feature pair is $l_0(d)=prob(d|H_0)$. The likelihood ratio is given $$by\ \Lambda(d) = \frac{l_1(d)}{l_0(d)} = \frac{prob(d|H_1)}{prob(d|H_0)}.$$

This test statistic is compared against a pre-determined threshold $\Omega$ for discrimination. The hypothesis $H_1$ is declared true, i.e., the given feature pair is declared to derive from the same physical lesion, when $\Lambda(d) \geq \Omega$; otherwise, the hypothesis $H_0$ is declared true and the feature pair is considered to derive from two physically different lesions.

To use this likelihood ratio test, the likelihood functions need to be determined. Let $(x_1^{(i)}, x_2^{(i)})$, $i=1, \ldots, N$, denote a feature pair in the corresponding dataset and $d^{(i)}$, $i=1, \ldots, N$, denote the distance of the pair to the regression line L established from the corresponding dataset.

By definition, $l_1(d)$ is the distribution of $d^{(i)}$. Therefore, it can be estimated from the histogram of $d^{(i)}$ provided that the population size N is sufficiently large. Given a relatively small population, one can apply gaussian smoothing to reduce sampling errors. That is, one estimates $l_1(d)$ by $$l_1(d) = \frac{1}{\sqrt{2\pi}\sigma N} \sum_{i=1}^{N} \exp\{-(d-d^{(i)})^2/2\sigma^2\},$$

wherein $\sigma > 0$ is a parameter controlling a level of smoothing. The likelihood function $l_0(d)$ is similarly estimated by using feature pairs from the non-corresponding dataset.

The Correlation of Features Between Views

Fifteen features were automatically extracted to represent the lesion in the sonographic database [19] to characterize the lesion's shape, margin sharpness, echogenic texture, and posterior acoustic behavior. A total of fifteen mammographic features [21] were also extracted from each lesion to quantitatively characterize the lesion's spiculation, margin sharpness, mass density, and texture. In order to validate the assumption of a linear relation of features between views, correlation of features were calculated between image views for corresponding dataset and non-corresponding dataset A in both databases. To that effect, Table II lists the top four correlation coefficients r for the corresponding datasets and r' for the non-corresponding datasets in the sonographic database. Similarly, Table II lists the top four correlation coefficients r for the corresponding datasets and r' for the non-corresponding datasets in the mammographic database. The associated p-values for image features extracted from two views are also listed in Tables II and III.

TABLE IV

| Feature | Corresponding Dataset | | Non-corresponding Datasets | | | | | |
| --- | --- | --- | --- | --- | --- | --- | --- | --- |
| | | | A | | B | | C | |
| | r | p-value | r' | p-value | r' | p-value | r' | p-value |
| Shape: Filtered ARD | 0.75 | <0.00001 | 0.38 | 0.004 | 0.24 | <0.001 | −0.08 | 0.166 |
| Filtered margin sharpness | 0.77 | <0.00001 | 0.36 | 0.007 | 0.17 | 0.003 | 0.01 | 0.864 |
| Posterior acoustic behavior | 0.82 | <0.00001 | 0.14 | 0.311 | 0.24 | <0.001 | −0.10 | 0.095 |
| Texture: conY4 | 0.62 | <0.00001 | 0.20 | 0.143 | 0.14 | 0.02 | 0.02 | 0.784 |

TABLE V

| Feature | Corresponding Dataset | | Non-corresponding Datasets | | | | | |
| --- | --- | --- | --- | --- | --- | --- | --- | --- |
| | | | A | | B | | C | |
| | r | p-value | r' | p-value | r' | p-value | r' | p-value |
| $NRG_{ROI}$ | 0.47 | <0.00001 | 0.31 | 0.144 | 0.15 | 0.011 | −0.12 | 0.043 |
| Average gray value | 0.66 | <0.00001 | 0.07 | 0.731 | 0.07 | 0.233 | 0.01 | 0.917 |
| Contrast | 0.56 | <0.00001 | 0.29 | 0.165 | 0.03 | 0.608 | 0.07 | 0.225 |
| Diameter | 0.50 | <0.00001 | 0.05 | 0.796 | 0.05 | 0.359 | −0.10 | 0.088 |

Training the Classifier for Lesion Matching

After identifying the correlated feature vectors, one first uses the features from the corresponding dataset to determine $\beta_0$ and $\beta_1$ for the linear regression model. The corresponding and non-corresponding datasets are used to train the classifier.

Figure 5:
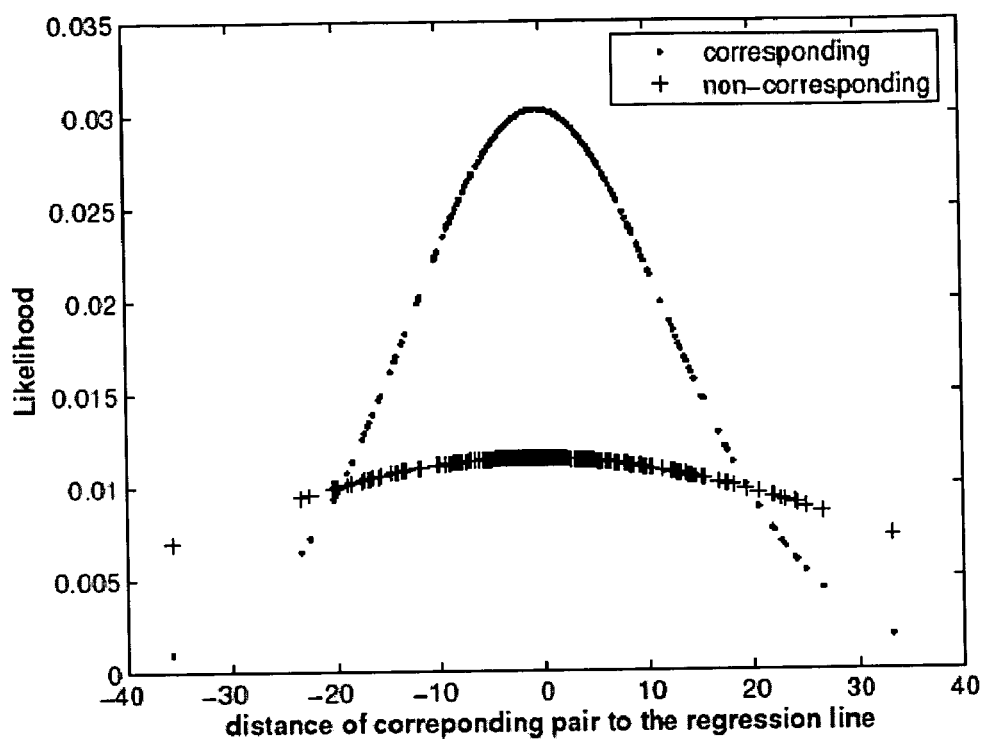
FIG. 5 illustrates the distribution of likelihood for corresponding and non-corresponding datasets for a posterior acoustic behavior feature.
Figure 6:
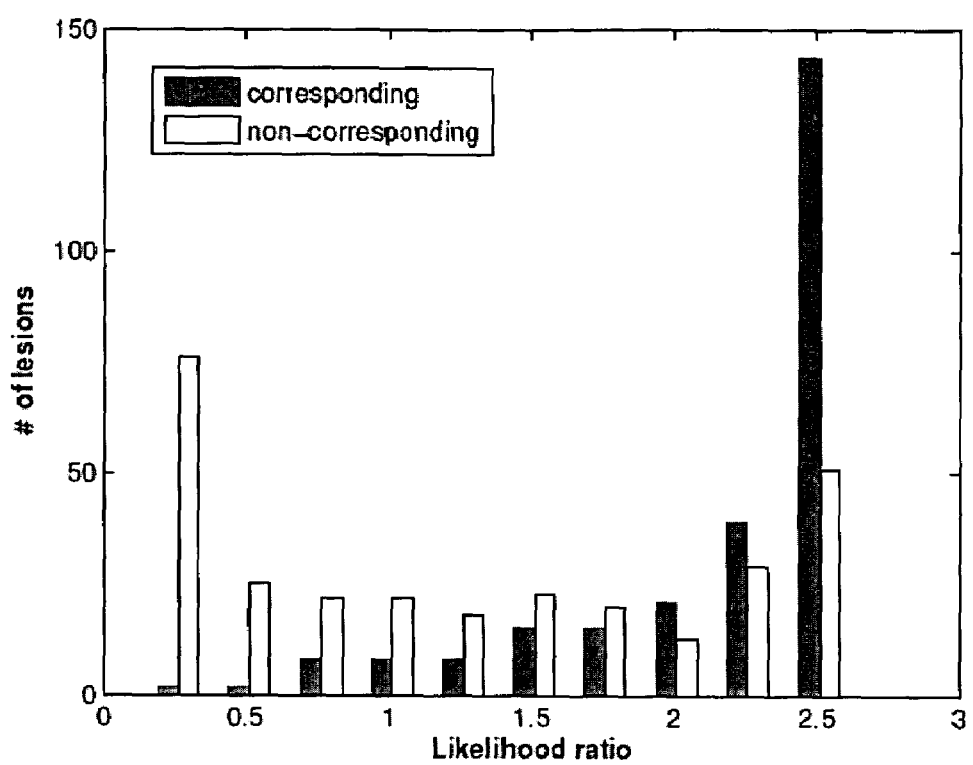
FIG. 6 illustrates a likelihood ratio histogram for corresponding and non-corresponding datasets for a posterior acoustic behavior feature.

FIGS. 5 and 6 illustrate the relationship between a feature obtained from two different views for the three datasets in the mammographic database and the sonographic database. FIG. 5 shows the likelihood distribution of the corresponding and non-corresponding pairs in terms of the sonographic feature posterior acoustic behavior. From these two distributions, one can calculate the likelihood ratio as a function of the distance to the regression line. Pairs of the corresponding dataset tend to have a larger likelihood ratio, yielding a likelihood ratio histogram skewed to the right, whereas pairs of the non-corresponding dataset tend to have a smaller likelihood ratio, yielding a likelihood ratio histogram skewed to the left. One can then classify whether a pair of images corresponds to the same actual lesion by performing the discrimination according to this likelihood ratio. By varying the decision variable threshold $\Omega$, an ROC curve can be computed from the training process for the discrimination task. From the ROC curve, one can determine an optimal threshold value of the classifier to yield some prescribed sensitivity and specificity in the task of distinguishing between corresponding and non-corresponding pairs.

The performance of this lesion-matching method can be evaluated for individual computer-extracted features by calculating the area under the curve (AUC) value of the ROC curve. ROC curves were generated for both re-substitution and round-robin analysis. The round-robin evaluation was performed to provide a more realistic estimate of the performance. In a round-robin evaluation, one of the patients is excluded from the database. That is, lesions from this patient are removed from the database and classified according to a classifier trained with the remaining lesions. This process is theses. The posterior acoustic behavior outperformed the other features in differentiating corresponding and non-corresponding lesions identified on sonograms, yielding an AUC value ranging from 0.73 to 0.79 (0.72 to 0.78 in round robin). The average gray value outperformed others for the mammographic database, yielding an AUC value ranging from 0.68 to 0.71 (0.66 to 0.70 in round robin).

Figure 7:
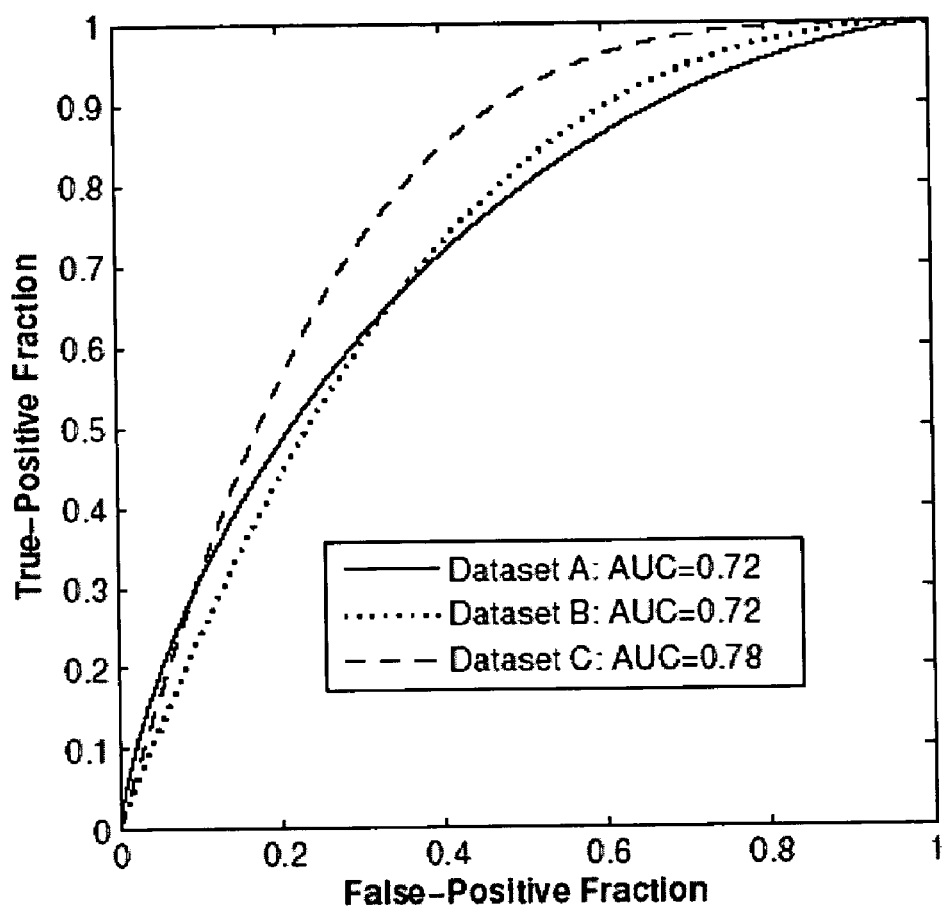
FIG. 7 illustrates a ROC curve for round-robin analysis and a sonographic feature (posterior acoustic behavior)
Figure 8:
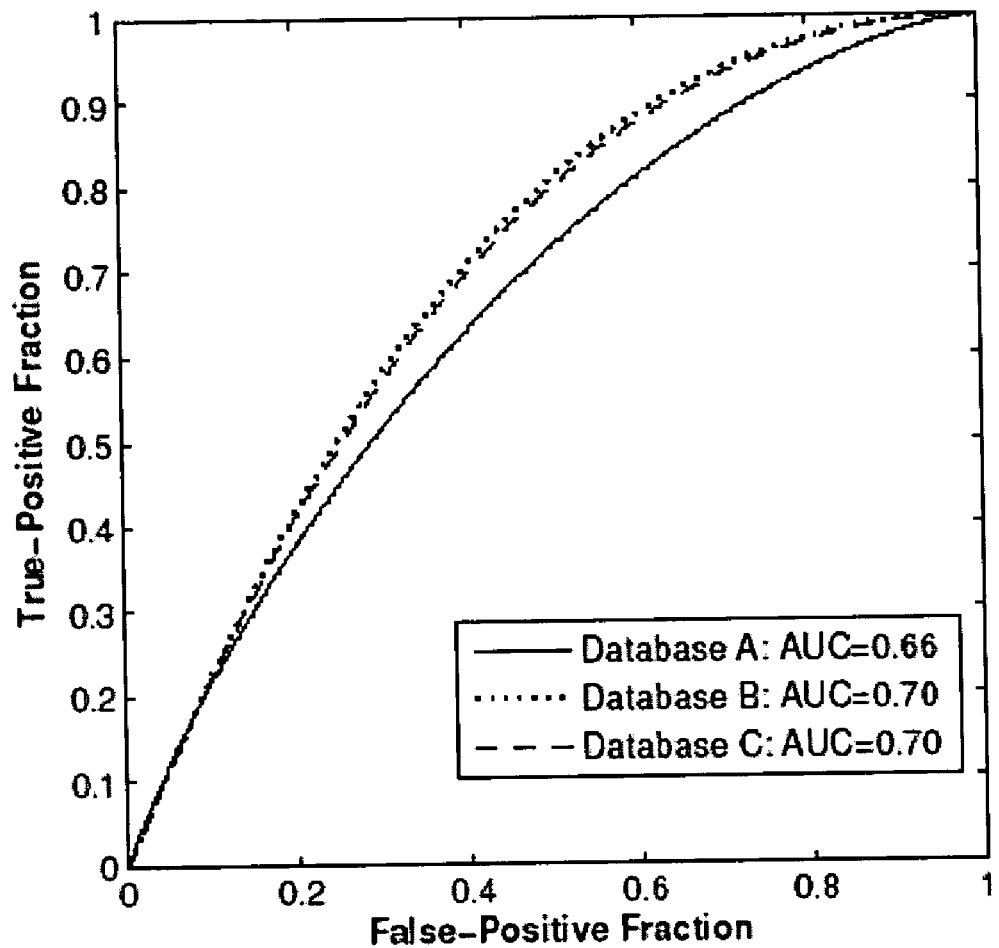
FIG. 8 illustrates a ROC curve for round-robin analysis and a mammographic feature (average grey value)

FIG. 7 illustrates the performance of the method in terms of ROC curves for the posterior acoustic behavior feature for each test in the task of distinguishing corresponding from non-corresponding lesion pairs in the sonographic database. Similarly, FIG. 8 illustrates the performance for the average gray value feature in the mammographic database.

| | US Database: 262 Corresponding lesion pairs | | | | | | | |
|---|---|---|---|---|---|---|---|---|
| | Data set A Non-Corresponding lesion pairs (53) | | Dataset B Non-Corresponding lesion pairs (300) | | | | Dataset C Non-Corresponding lesion pairs (300) | |
| Features | Resubsituation | Round robin | Resubsituation ($\sigma$) | | Round robin ($\sigma$) | | Resubsituation ($\sigma$) | Round robin ($\sigma$) |
| Shape: Filtered ARD | 0.59 | 0.57 | 0.68 | (0.01) | 0.67 | (0.01) | 0.74 (0.01) | 0.73 (0.01) |
| Filtered margin sharpness | 0.61 | 0.58 | 0.71 | (0.02) | 0.70 | (0.02) | 0.76 (0.02) | 0.74 (0.02) |
| Posterior acoustic behavior | 0.75 | 0.72 | 0.72 | (0.01) | 0.70 | (0.02) | 0.79 (0.02) | 0.78 (0.02) |
| Texture: conY4 | 0.67 | 0.6 | 0.69 | (0.02) | 0.67 | (0.02) | 0.70 (0.01) | 0.68 (0.01) |

| | Mammogram Database: 230 Corresponding lesion pairs | | | | | | | |
|---|---|---|---|---|---|---|---|---|
| | Dataset A Non-Corresponding lesion pairs (25) | | Dataset B Non-Corresponding lesion pairs (300) | | | | Dataset C Non-Corresponding lesion pairs (300) | |
| Features | Resubsituation | Round robin | Resubsituation ($\sigma$) | | Round robin ($\sigma$) | | Resubsituation ($\sigma$) | Round robin ($\sigma$) |
| $NRG_{ROI}$ | 0.60 | 0.58 | 0.60 | (0.01) | 0.59 | (0.01) | 0.66 (0.01) | 0.64 (0.01) |
| Average gray value | 0.68 | 0.66 | 0.70 | (0.01) | 0.69 | (0.01) | 0.72 (0.01) | 0.71 (0.01) |
| Contrast | 0.68 | 0.53 | 0.62 | (0.01) | 0.60 | (0.02) | 0.63 (0.02) | 0.61 (0.02) |
| Diameter | 0.68 | 0.54 | 0.66 | (0.02) | 0.63 | (0.02) | 0.67 (0.01) | 0.65 (0.02) | then repeated for each patient. For datasets generated by lesions across patients, one assumes lesions have been corresponding to a lesion and its counter-part are from the same patient and eliminates them from the training process.

Tests using the corresponding dataset paired with the non-corresponding datasets A, B, and C were conducted to assess the performance of the method in distinguishing between corresponding and non-corresponding pairs. The results of the four features that yielded the four highest AUC values are summarized in Tables IV and V which displays the performance in terms of AUC of individual features for the sonographic and mammographic databases, respectively, in the task of distinguishing between corresponding and non-corresponding pairs. Independent validation was performed 11 times by randomly selecting 300 non-corresponding pairs for datasets B and C. The performance lists for these validations are average AUC values resulting from ROC analysis of each of the 11 independent trials. The standard deviations on the AUC values are given in parentheses.

Furthermore, sonograms from 35 patients who have two or more lesions in the same breast were used to conduct a test for 48 corresponding lesion pairs and 53 non-corresponding lesion pairs. In this test, the posterior acoustic behavior feature performed well with an AUC of 0.81 (0.77 in round robin), which indicates that the non-corresponding datasets B and C comprised by lesions across patients can provide a good estimation in clinical practice.

Figure 9:
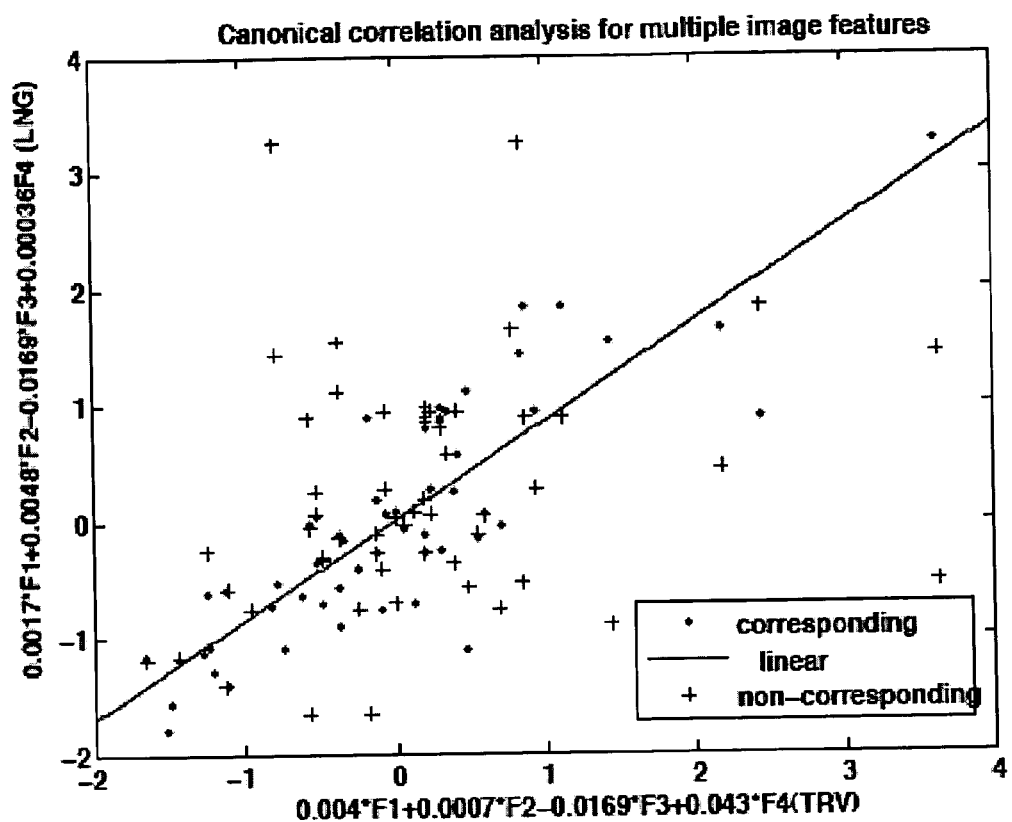
FIG. 9 illustrates a canonical correlation analysis for multiple features.

FIG. 9 illustrates that the calculated canonical correlation coefficient for four sonographic features (filtered ARD, filtered margin sharpness, posterior acoustic behavior, and texture) derived from the two lesions corresponding to the same physical lesion is 0.85. In comparison, the calculated canonical correlation is 0.37 for the same features when derived from different lesions. A linear relationship can be observed for the canonical variables for features extracted from the two lesions correspond to the same physical lesion. On the other hand, the canonical variables for features derived from different lesions show a much wider spread in distribution. The observed difference in the spreads of the distributions for the two populations can be utilized for classification.

Figure 10:
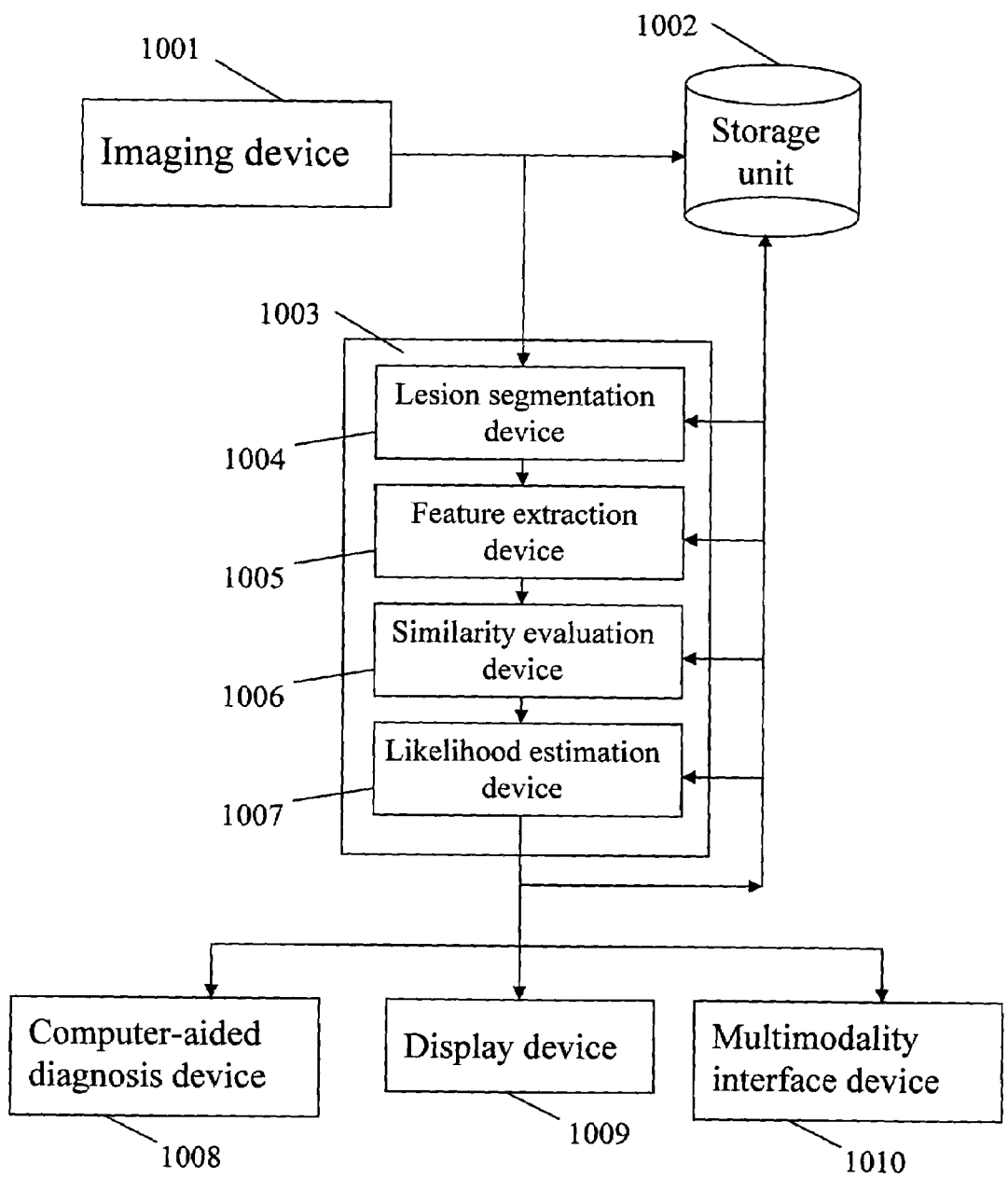
FIG. 10 illustrates a system for correlating medical images.

FIG. 10 illustrates a system for carrying out embodiments of the present invention. An imaging device 1001 is used to acquire medical images. The images can be stored using a storage unit 1002. The images can be processed by a computing unit 1003 comprising a lesion segmentation device 1004, which automatically segments lesions from the background, a feature extraction device 1005, which automatically extracts at least one feature corresponding to the lesions, a similarity evaluation device 1006, which determines the similarity between the features corresponding to the lesions, and a likelihood estimation device 1007 which determines a likelihood that the lesions all correspond to the same lesion. The system can also comprise a computer-aided diagnosis device 1008, a display device 1009, and/or a multimodality device 1010, all configured to receive and use the likelihood that the lesions all correspond to the same lesion.

Alternatively, the image data of interest may be stored in an image archiving system, such as Picture Archiving Communications System (PACS), and retrieved therefrom for processing according to the present invention. Either way, the present invention obtains the image data for subsequent processing as described before.

Embodiments of the invention can modify and improve upon a system for a multimodality display workstation that displays the images as well as information derived from the images. The novel workstation can incorporate multimodality images of the same patient, automatically assess whether the same lesion is being considered across the images, and automatically relate the information calculated from one modality to that from another. For example, the lesion seen on multiple images may be characterized by mammographic feature, sonographic features, MRI features, as well as combination features. Similar lesions across modalities can be automatically retrieved from on-line multimodality reference atlases. In addition, the physical lesion can be represented on single and multi-modality distributions of malignant, benign, and other states. Further, besides presentation of computer calculated and/or generated data, novel means to display image data can also be incorporated.

All embodiments of the present invention conveniently may be implemented using a conventional general purpose computer or micro-processor programmed according to the teachings of the present invention, as will be apparent to those skilled in the computer art. Appropriate software may readily be prepared by programmers of ordinary skill based on the teachings of the present disclosure, as will be apparent to those skilled in the software art. In particular, the computer housing may house a motherboard that contains a CPU, memory (e.g., DRAM, ROM, EPROM, EEPROM, SRAM, SDRAM, and Flash RAM), and other optional special purpose logic devices (e.g., ASICS) or configurable logic devices (e.g., GAL and reprogrammable FPGA). The computer also includes plural input devices, (e.g., keyboard and mouse), and a display card for controlling a monitor. Additionally, the computer may include a floppy disk drive; other removable media devices (e.g. compact disc, tape, and removable magneto-optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus.

Examples of computer program products associated with the present invention include compact discs, hard disks, floppy disks, tape, magneto-optical disks, PROMs (e.g., EPROM, EEPROM, Flash EPROM), DRAM, SRAM, SDRAM, etc. Stored on any one or on a combination of these computer readable media, the present invention includes software for controlling both the hardware of the computer and for enabling the computer to interact with a human user. Such software may include, but is not limited to, device drivers, operating systems and user applications, such as development tools. Computer program products of the present invention include any computer readable medium which stores computer program instructions (e.g., computer code devices) which when executed by a computer causes the computer to perform the method of the present invention. The computer code devices of the present invention may be any interpretable or executable code mechanism, including but not limited to, scripts, interpreters, dynamic link libraries, Java classes, and complete executable programs. Moreover, parts of the processing of the present invention may be distributed (e.g., between (1) multiple CPUs or (2) at least one CPU and at least one configurable logic device) for better performance, reliability, and/or cost. For example, an outline or image may be selected on a first computer and sent to a second computer for remote diagnosis.

The invention may also be implemented by the preparation of application specific integrated circuits or by interconnecting an appropriate network of conventional component circuits, as will be readily apparent to those skilled in the art.

The present method of feature-based correlation can also be implemented more generally by one of ordinary skill in the art for the correlation of other abnormalities of other organs. In particular, the present method is applicable to any type of abnormalities in N dimensions (N>1). Thus, an embodiment of the present method can be readily applied to 2D/3D aneurysms, embolisms, lung cancer, stomach cancer, etc.

For the purposes of this description, an image is defined to be a representation of a physical scene, in which the image has been generated by some imaging technology. Examples of imaging technology include television or CCD cameras, or X-ray, sonar, nuclear, or ultrasound imaging devices. The initial medium on which an image is recorded could be an electronic solid-state device, a photographic film, or some other device such as a photostimulable phosphor. That recorded image could then be converted into digital form by a combination of electronic (as in the case of a CCD signal) or mechanical/optical means (as in the case of digitizing a photographic film or digitizing the data from a photostimulable phosphor). The number of dimensions that an image could have could be one (e.g., acoustic signals), two (e.g., X-ray radiological images), or more (e.g., tomosynthesis or nuclear magnetic resonance images).

Numerous modifications and variations of the present invention are possible in light of the above teachings. It is therefore to be understood that within the scope of the appended claims, the invention may be practiced otherwise than as specifically described herein.

The invention claimed is:

1. A computer-implemented method for correlating medical images, comprising:
obtaining first image data representative of a first medical image including a first abnormality;
obtaining second image data representative of a second medical image including a second abnormality;

determining at least one feature value for each of the first and second abnormalities using the first and second image data;

calculating, based on the determined feature values, a likelihood value indicative of a likelihood that the first and second abnormalities are a same abnormality; and outputting the determined likelihood value, wherein the step of obtaining the first image data comprises obtaining first image data representative of the first medical image derived using a first modality, the first modality being one of mammography, sonography, and magnetic resonance imaging; and the step of obtaining the second image data comprises obtaining second image data representative of the second medical image derived using a second modality different from the first modality.

2. The method of claim 1, wherein the step of obtaining the first image data comprises obtaining first image data representative of the first medical image using a first modality, in a given view; and the step of obtaining the second image data comprises obtaining second image data representative of the second medical image derived using a second modality, in a view different from the given view.

3. The method of claim 1, wherein the step of obtaining the first image data comprises obtaining first image data representative of the first medical image using a first modality, in a given time; and the step of obtaining the second image data comprises obtaining second image data representative of the second medical image using the first modality, at a time different from the given time.

4. The method of claim 1, wherein the step of obtaining the first image data comprises obtaining first image data representative of the first medical image using a first protocol of a first modality; and the step of obtaining the second image data comprises obtaining second image data representative of the second medical image using a second protocol of the first modality, the second protocol being different from the first protocol.

5. The method of claim 1, wherein the determining step comprises: automatically segmenting the first and second abnormalities.

6. The method of claim 1, wherein the determining step comprises:

identifying at least one maximally correlated feature using a canonical correlation analysis; and determining a value for each of the at least one maximally correlated feature for each of the first and second abnormalities.

7. The method of claim 6, wherein the identifying step comprises:

selecting the at least one maximally correlated feature from a list of candidate features including filtered ARD, filtered margin sharpness, posterior acoustic behavior, texture, NRG, average gray value, contrast, and diameter.

8. The method of claim 1, wherein the determining step comprises:

evaluating a measure of similarity between maximally correlated features to determine feature-conditioned likelihoods that the first and second abnormalities are the same abnormality.

9. The method of claim 8, wherein the calculating step comprises:

using a likelihood ratio test based on the feature-conditioned likelihoods that the first and second abnormalities are the same abnormality.

10. The method of claim 1, wherein the calculating step comprises:

applying the determined feature values to a classifier to obtain the likelihood value.

11. A system for correlating medical images, comprising:

a mechanism configured to obtain first image data representative of a first medical image including a first abnormality;

a mechanism configured to obtain second image data representative of a second medical image including a second abnormality;

a mechanism configured to determine at least one feature value for each of the first and second abnormalities using the first and second image data;

a mechanism configured to calculate, based on the determined feature values, a likelihood value indicative of a likelihood that the first and second abnormalities are a same abnormality; and a mechanism configured to output the determined likelihood value, wherein the mechanism configured to obtain the first image data comprises a mechanism configured to obtain first image data representative of the first medical image using a first modality, the first modality being one of mammography, sonography, and magnetic resonance imaging; and the mechanism configured to obtain the second image data comprises a mechanism configured to obtain second image data representative of the second medical image using a second modality different from the first modality.

12. The system of claim 11, wherein the mechanism configured to obtain the first image data comprises a mechanism configured to obtain first image data representative of the first medical image using a first modality, in a given view; and the mechanism configured to obtain the second image data comprises a mechanism configured to obtain second image data representative of the second medical image using the first modality, in a view different from the given view.

13. The system of claim 11, wherein the mechanism configured to obtain the first image data comprises a mechanism configured to obtain first image data representative of the first medical image using a first modality, at a given time; and the mechanism configured to obtain the second image data comprises a mechanism configured to obtain second image data representative of the second medical image using the first modality, at a time different from the given time.

14. The system of claim 11, wherein the mechanism configured to obtain the first image data comprises a mechanism configured to obtain first image data representative of the first medical image using a first protocol of a first modality; and the mechanism configured to obtain the second image data comprises a mechanism configured to obtain second image data representative of the second medical image using a second protocol of the first modality, the second protocol being different from the first protocol.

15. The system of claim 11, wherein the mechanism configured to determine comprises:

a mechanism configured to automatically segment the first and second abnormalities.

16. The system of claim 11, wherein the mechanism configured to determine comprises:
a mechanism configured to identify at least one maximally correlated feature use a canonical correlation analysis; and
a mechanism configured to determine a value for each of the at least one maximally correlated feature for each of the first and second abnormalities.

17. The system of claim 16, wherein the mechanism configured to identify the at least one maximally correlated feature comprises:
a mechanism configured to select the at least one maximally correlated feature from a list of candidate features including filtered ARD, filtered margin sharpness, posterior acoustic behavior, texture, NRG, average gray value, contrast, and diameter.

18. The system of claim 11, wherein the mechanism configured to determine comprises:
a mechanism configured to evaluate a measure of similarity between maximally correlated features to determine feature-conditioned likelihoods that the first and second abnormalities are the same abnormality.

19. The system of claim 18, wherein the mechanism configured to calculate comprises:
a mechanism configured to use a likelihood ratio test based on the feature-conditioned likelihoods that the first and second abnormalities are the same abnormality.

20. The system of claim 11, wherein the mechanism configured to calculate comprises:
a mechanism configured to apply the determined feature values to a classifier to obtain the likelihood value.

21. A computer program product which stores, on a computer-readable medium, instructions for execution on a computer system, which when executed by the computer system, causes the computer system to perform the steps of:
obtaining first image data representative of a first medical image including a first abnormality;
obtaining second image data representative of a second medical image including a second abnormality;
determining at least one feature value for each of the first and second abnormalities using the first and second image data;
calculating, based on the determined feature values, a likelihood value indicative of a likelihood that the first and second abnormalities are a same abnormality; and
outputting the determined likelihood values,
wherein the step of obtaining the first image data comprises obtaining first image data representative of the first medical image using a first modality, the first modality being one of mammography, sonography, and magnetic resonance imaging; and
the step of obtaining the second image data comprises obtaining second image data representative of the second medical image using a second modality different from the first modality.

22. The computer program product of claim 21, wherein the step of obtaining the first image data comprises obtaining first image data representative of the first medical image using a first modality, in a given view; and
the step of obtaining the second image data comprises obtaining second image data representative of the second medical image using the first modality, in a view different from the given view.

23. The computer program product of claim 21, wherein the step of obtaining the first image data comprises obtaining first image data representative of the first medical image using a first modality, at a given time; and
the step of obtaining the second image data comprises obtaining second image data representative of the second medical image using the first modality, at a time different from the given time.

24. The computer program product of claim 21, wherein the step of obtaining the first image data comprises obtaining first image data representative of the first medical image using a first protocol of a first modality; and
the step of obtaining the second image data comprises obtaining second image data representative of the second medical image using a second protocol of the first modality, the second protocol being different from the first protocol.

25. The computer program product of claim 21, wherein the determining step comprises:
automatically segmenting the first and second abnormalities.

26. The computer program product of claim 21, wherein the determining step comprises:
identifying at least one maximally correlated feature using a canonical correlation analysis; and
determining a value for each of the at least one maximally correlated feature for each of the first and second abnormalities.

27. The computer program product of claim 26, wherein the identifying step comprises:
selecting the at least one maximally correlated feature from a list of candidate features including filtered ARD, filtered margin sharpness, posterior acoustic behavior, texture, NRG, average gray value, contrast, and diameter.

28. The computer program product of claim 21, wherein the determining step comprises:
evaluating a measure of similarity between maximally correlated features to determine feature-conditioned likelihoods that the first and second abnormalities are the same abnormality.

29. The computer program product of claim 28, wherein the calculating step comprises:
using a likelihood ratio test based on the feature-conditioned likelihoods that the first and second abnormalities are the same abnormality.

30. The computer program product of claim 21, wherein the calculating step comprises:
applying the determined feature values to a classifier to obtain the likelihood value.

* * * * *

UNITED STATES PATENT AND TRADEMARK OFFICE
CERTIFICATE OF CORRECTION

PATENT NO. : 7,298,881 B2
APPLICATION NO. : 11/056368
DATED : November 20, 2007
INVENTOR(S) : Maryellen L. Giger et al.

It is certified that error appears in the above-identified patent and that said Letters Patent is hereby corrected as shown below:

On column 1 lines 16-19, please the entire paragraph "The present invention was made in part with U.S. Government support under USPHS Grant No. T32 CA09649. The U.S. Government may have certain rights to this invention."
and replace it with the following paragraph:
--This invention was made with government support under grant numbers CA009649 and CA089452 awarded by the National Institutes of Health (NIH). The government has certain rights in the invention.--

Signed and Sealed this

Twenty-ninth Day of April, 2008

JON W. DUDAS
*Director of the United States Patent and Trademark Office*